United States Patent [19]

Moisin

[11] Patent Number: 4,580,013
[45] Date of Patent: Apr. 1, 1986

[54] HANDSFREE COMMUNICATION APPARATUS AND METHOD

[75] Inventor: Mihail S. Moisin, Calgary, Canada

[73] Assignee: Northern Telecom Limited, Montreal, Canada

[21] Appl. No.: 652,283

[22] Filed: Sep. 20, 1984

[30] Foreign Application Priority Data

Jun. 29, 1984 [CA] Canada .................................. 457899

[51] Int. Cl.⁴ ........................ H04M 1/60; H04M 9/08
[52] U.S. Cl. ............................................... 179/81 B
[58] Field of Search .............. 179/81 B, 100 L, 170.2; 381/94

[56] References Cited

U.S. PATENT DOCUMENTS 3,889,059  6/1975  Thompson et al. ................ 179/81 B
4,051,325  9/1977  Mafune et al. ..................... 179/81 B
4,101,735  7/1978  Bridenbaugh ...................... 179/81 B Primary Examiner—James L. Dwyer
Attorney, Agent, or Firm—J. E. Moorhouse

[57] ABSTRACT

A handsfree communication terminal apparatus includes a transit switch being controllable for passing signals from a microphone to a transmission interface, during a transmit mode of operation, and a receive switch being controllable for passing signals from the transmission interface to a loudspeaker, during a receive mode of operation. A transmit signal processing circuit followed by a converter circuit generate transmit binary signal assertions in response to syllable-like characteristics in the signals from the microphone. A receive signal processing circuit followed by a converter circuit generate receive binary signal assertions in response to syllable-like characteristics in the signals from the transmission interface. A controller includes transmit and receive bistable circuits, each being clock setable by the respective binary signal assertions and being jam reset in response to the opposite binary signal assertions. The controller also includes logic gates arranged to be responsive to the set and reset states of the bistable circuits for generating transmit and receive mode signals for controlling the respective switches to provide voice-switched operation of the apparatus.

6 Claims, 5 Drawing Figures

HANDSFREE COMMUNICATION APPARATUS AND METHOD

FIELD OF THE INVENTION

The invention is in the field of communication apparatus and more particularly relates to loudspeaking terminal apparatus including a voice switch for handsfree operation.

BACKGROUND OF THE INVENTION

A handsfree communication apparatus, for example a handsfree telephone is typically characterized by transmit and receive channels, a transmission facility interface and a controller for biasing the operation of the apparatus toward one of transmit and receive modes of operation. The controller includes a comparator circuit which compares signals in the transmit and receive channels and determines the mode of operation in accordance with which channel has the strongest signal. The two modes of operation are essentially mutually exclusive in order to prevent oscillation due to feeback between a microphone in the transmit channel and a loudspeaker in the receive channel. Fortunately persons involved in a telephone conversation seldom talk at the same time and therefore virtually normal telephone conversation can be handsfree voice switched if the controller is able to reliably identify which party is talking and which party is listening. A primary problem in handsfree telephony is that of instantaneously determining which of the two modes should be prevalent.

For example, the control mechanism should be sensitive to a user's voice signal received by the microphone to activate the transmit mode. However it should be able to distinguish between the user's voice signal and other voice band frequency signals such as background noise and those signals produced by the loudspeaker, otherwise undesired switching to the transmit mode will occur. Furthermore the control mechanism should also be sensitive to voice signals received from an associated transmission facility, for example a telephone line, to activate the receive mode. However it should be able to distinguish received voice signals from other voice band noise signals received from the telephone line.

All of these requirements have been achieved in the past with some degree of success, sufficient to permit the manufacture and sale of voice switched handsfree telephone apparatus. However the quality of voice switching operation seems to vary directly with complexity and cost of manufacture. For example, a simple control mechanism is one which normally operates the apparatus in the receive mode and only switches to the transmit mode in response to a strong signal at the microphone. If the control mechanism is sensitive enought to avoid first syllable clipping in switching to the transmit mode, the handsfree operation also tends to chatter or oscillate between modes and in higher noise environments will lock out the receive mode. Therefore the control mechanism is typically compromised to avoid persistent chatter or lock-out while introducing some undesirable clipping.

In another more elaborate example of a voice switched handsfree telephone as disclosed by J. L. E. Thompson et al, separate envelope detectors to distinguish between noise-like monotonous signals and voice-like fluctuation signals are provided in a control mechanism which provides an idle mode of operation intermediate the transmit and receive modes of operation. When neither party is speaking the idle mode prevails with both the transmit and receive channels being controlled to be partially ON, and biased more or less toward the receive mode in accordance with there being more or less of the monotonous signal from the microphone. Hence the control mechanism can respond more quickly to a first syllable of speech signals in the transmit and receive channels to avoid first syllable clipping without the consequence of chatter problems. However, in spite of additional circuitry tailored to augment and delay transitions between full transmit and full receive modes for optimized performance, the handsfree voice switched telephone conversation remains uncomfortable for persons not normally used to conversing with someone using the apparatus.

SUMMARY OF THE INVENTION

It is an object of the invention to provide a voice switched handsfree communication apparatus which has improved operating characteristics and is relatively inexpensive to manufacture.

In one example the handsfree communication apparatus includes transmit and receive analog signal processors which independently distinguish syllable-like, word-like and noise-like signals in the transmit and receive channels. Transmit and receive comparators each generate binary signal assertions corresponding to instances wherein respective syllable-like signals exceed the respective noise-like signal. A digital circuitry controller is responsive to the binary signals from the comparators to operate switches in the transmit and receive channels to provide transmit and receive modes of operation.

A handsfree communication terminal apparatus in accordance with the invention comprises a transmit channel which is operable in a transmit mode to transmit electrical signal representations of acoustical signals to a transmission facility. A receive channel is operable in a receive mode to reproduce acoustical signals in accordance with electrical signals received from the transmission facility. A sequential controller generates transmit and receive mode signals in a mutually exclusive manner for operation of the transmit and receive channels respectively, in response to binary transmit and receive signals. A transmit signal converter is responsive to transmit intelligence and transmit threshold signals for asserting the binary transmit signal while the former exceeds the latter. A receive signal converter is responsive to receive intelligence and receive threshold signals for asserting the binary receive signal while the former exceeds the latter. A transmit analog signal processing circuit processes electrical voice band signals from the transmit channel to generate the transmit intelligence signal by one of at least two alternately selectable filter processes corresponding to the transmit mode signal being asserted or the receive mode signal being asserted. The transmit analog signal processing circuit also processes the electrical voice band signals from the transmit channel to generate the transmit threshold signal by a selectable filter function in accordance with the respective signal states of the binary receive signal. A receive analog signal processing circuit processes electrical voice band signals from the receive path to generate the receive intelligence signal by one of at least two alternately selectable filter processes corresponding to the receive mode signal being asserted or the transmit mode signal being asserted. The receive analog signal processing circuit also processes the electrical voice band signals from the receive channel to generate the receive threshold signal by a selectable filter function in accordance with the signal states of the binary transmit signal.

BRIEF DESCRIPTION OF THE DRAWINGS

An example embodiment is described with reference to the accompanying drawings in which.

DESCRIPTION OF THE EXAMPLE EMBODIMENT

Figure 1:
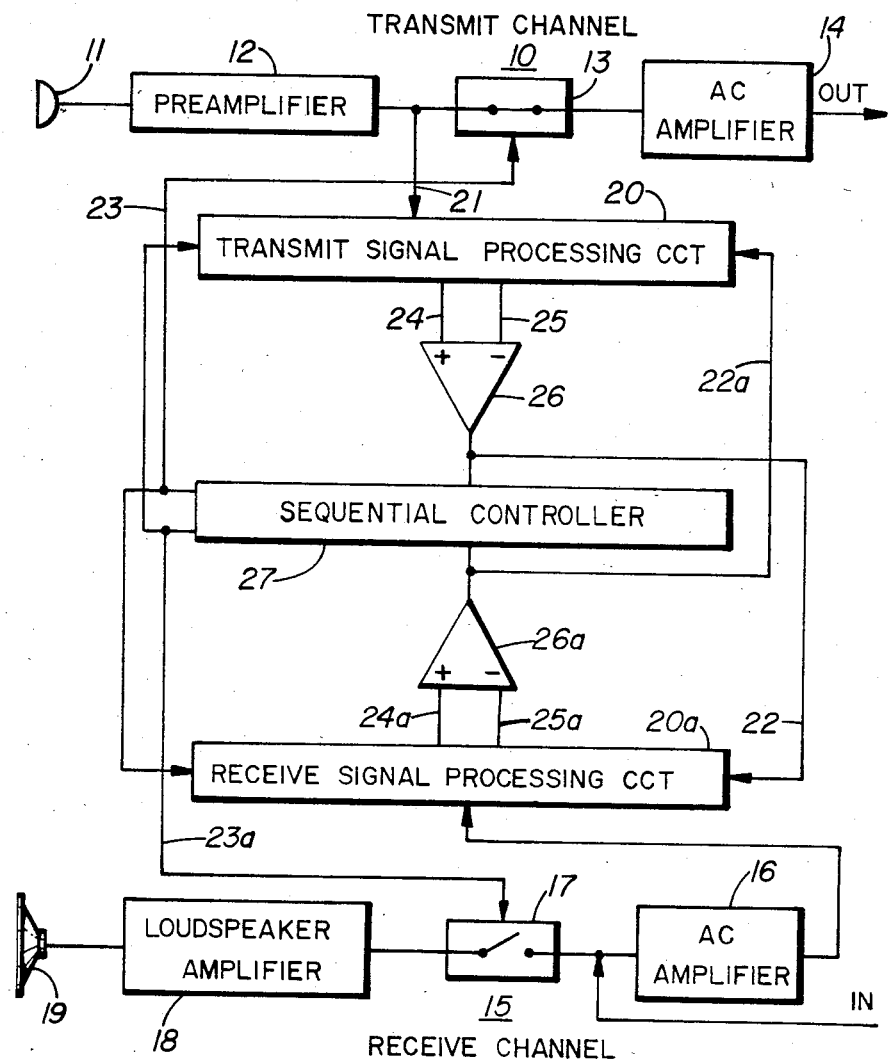
FIG. 1 is a block schematic diagram of a handsfree communication apparatus in accordance with the invention.

The appratus in FIG. 1 includes transmit and receive channels 10 and 15, transmit and receive signal processing circuits 20 and 20a, transmit and receive comparators 26 and 26a, and a sequential controller 27.

The transmit channel 10 includes a microphone 11 for example an electret type microphone for converting acoustical signals to electrical signals which are then amplified by a preamplifier 12. The transmit channel is illustrated in a transmit mode of operation with a switch 13 passing the amplified signals from the output of the preamplifier 12 to an input of an AC amplifier 14. The AC amplifier 14 is arranged to provide the amplified signals from its output, with a source impedance suitable for a telephone line interface device, for example, a transformer hybrid circuit, not shown.

The receive channel 15 includes an AC amplifier 16 and a switch 17 for receiving signals from the telephone line interface device. The receive channel 15 is shown with the switch 17 being in an open circuit condition, corresponding to operation in the transmit mode, such that receive signals are blocked from a loudspeaker amplifier 18 and hence are not acoustically produced by a loudspeaker 19, as they otherwise would be during operation in the receive mode. The switches 13 and 17 are symbolically shown in FIG. 1 for simplicity of illustration. In this embodiment each of the switches is provided by a portion of a quad analog switch available from Motorola under product code number MC14066B.

The transmit signal processing circuit 20 receives analog signals from the microphone 11 via the preamplifier 12 and a lead 21 and generates therefrom a transmit intelligence signal on a lead 24, and a transmit threshold signal on a lead 25. Filter processes by which these signals are generated are controlled by binary control signals received on leads 22a and 23a. The transmit comparator 26 responds to the transmit intelligence signal and the transmit threshold signal by asserting a binary transmit signal on a lead 22 during those instances where the amplitude of the transmit intelligence signal excees the amplitude of the transmit threshold signal. Assertion of the binary transmit signal indicates a presence of voice-like acoustical signals being originated near the microphone 11 as for example voice utterances.

The receive signal processing circuit 20a in this example is of a structure identical to the transmit signal processing circuit 20. The receive signal processing circuit 20a receives analog signals from the telephone line interface device via the AC amplifier 16 and a lead 21a and generates therefrom a receive intelligence signal on a lead 24a and a receive threshold signal on a lead 25a. Filter processes by which these signal are generated are controlled by binary control signals received on a lead 23 and on the lead 22. The receive comparator 26a responds to the receive intelligence signal and the receive threshold signal by asserting a binary receive signal on the lead 22a during those instances where the amplitude of the receive intelligence signal exceeds the amplitude of the receive threshold signal. Assertion of the binary receive signal indicates a presence of analog signals received from the telephone line interface device which represent voice-like signals. An example of the signal processing circuits is described later in detail detail with reference to FIGS. 2, 4 and 5 of the drawings.

The sequential controller 27 uses the binary transmit and receive signals to generate a binary transmit mode signal on a lead 23 and to generate a binary receive mode signal on a lead 23a. These signals control the operation of the switches 13 and 17 in an abrupt manner to effect a transition between the transmit and receive modes of operation, each transition typically taking less than a few microseconds to occur. The controller is sequentially responsive to assertions of the binary transmit and receive signals such that assertion of either signal causes generation of the corresponding mode signal, providing that the other signal is not already asserted. Furthermore while neither of the binary transmit and receive signals are asserted, the prevailing mode signal corresponds to the last asserted one of the binary transmit and receive signals.

Figure 2:
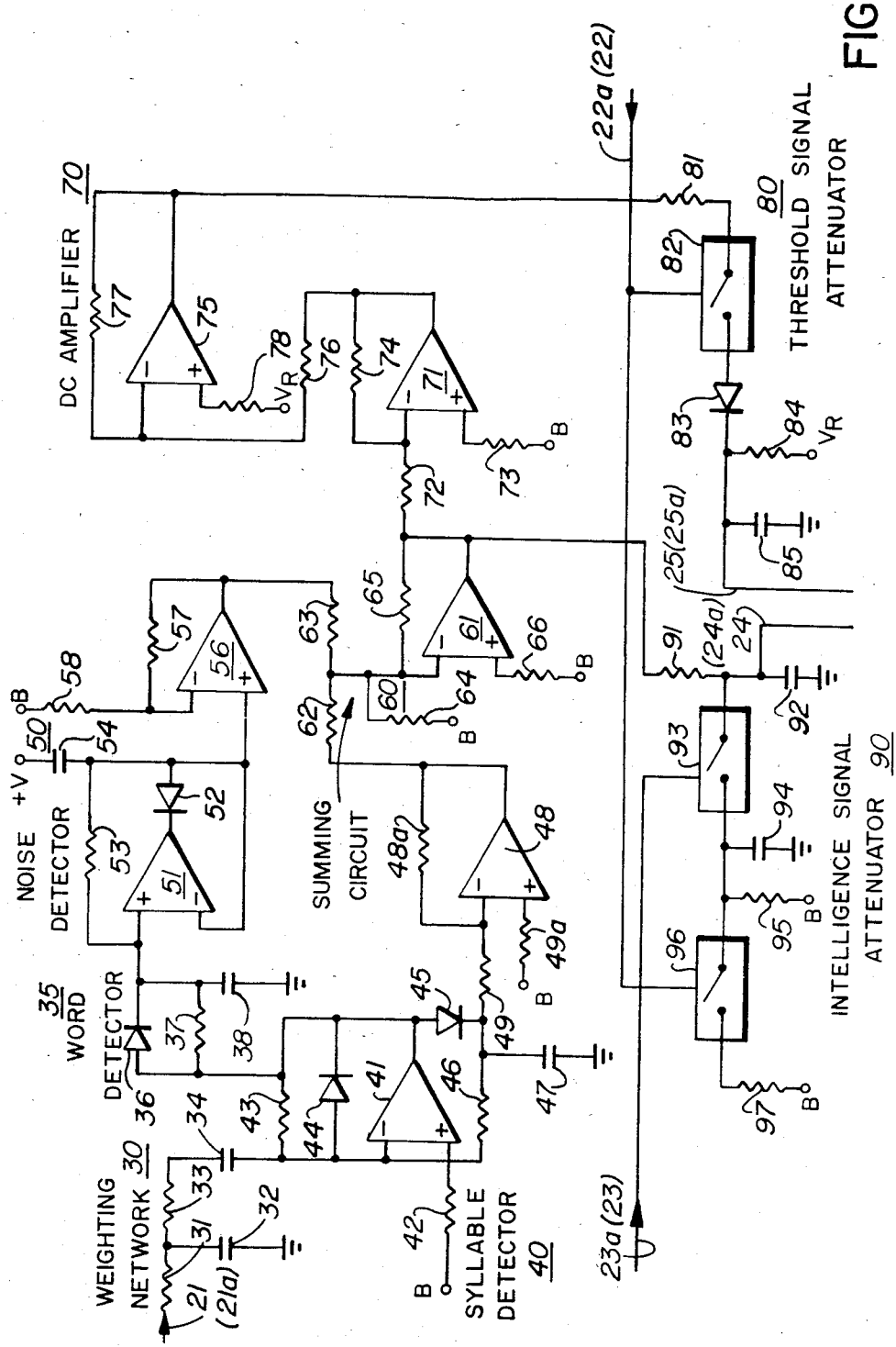
FIG. 2 is a schematic diagram of a signal processing circuit used in the apparatus illustrated in FIG. 1.

The transmit and receive signal processing circuits in FIG. 1 are each provided for by a circuit as illustrated in detail in FIG. 2. However details as to the distribution of power and ground are omitted except in those instances where such detail is convenient for an understanding of the operation of the example embodiment. Terminals labelled B are supplied with a DC bias voltage from a low a.c. impedance source, not shown. In this example the DC bias voltage is 2.25 volts.

In FIG. 2 lead connections correspondidng to the transmit signal processing circuit 20 are labelled 21, 22a, 23a, 24 and 25, and lead connections corresponding to the receive signal processing circuit 20a are labelled 21a, 22, 23, 24a and 25a. A weighting network 30, which includes resistors 31 and 33 and capacitors 32 and 34 connected as shown, filters analog voiceband signals from the transmit channel or the receive channel, as the case may be, introducing attenuation similar to that illustrated in the graphs of FIG. 5. Following the weighting network 30 there are two paths or branches in the signal processing circuit, one including a syllable detector 40 and the other including a word detector 35 followed by a noise detector 50. A syllable detector 40 is coupled by the weighting network 30 to receive the analog voiceband signals with a response characteristic similar to the average response characteristic of the human ear. The syllable detector is comprised of operational amplifiers 41 and 48, resistors 42, 43, 46, 48a, 49 and 49a, diodes 44 and 45, and a capacitor 47, as shown.

A junction of the output of the operational amplifier 41 and the diodes 44 and 45 provides a positive half-wave rectification of the filtered signals. The resistor 43 provides for negative feedback during times of low signal amplitude when the resistance of the diodes 44 and 45 is high. The diode 45 in combination with an RC time constant of about 7.5 milliseconds for the resistor 46 and the capacitor 47 provides an envelope detector wherein amplitude envelope variations at a typical syllabic rate and slower are detected to provide a syllable envelope signal. The syllable envelope signal is inverted by the operational amplifier 48 and applied to a resistor. The word detector 35 includes a diode 36, a resistor 37, and a capacitor 38 connected as shown. The RC time constant of the resistor 37 and the capacitor 38 is about 50 milliseconds such that amplitude envelope fluctuation at a typical word rate and slower are passed from the output of the operational amplifier 41 to an input of a noise detector 50. The noise detector 50 includes operational amplifiers 51 and 56, a diode 52, a capacitor 54, and resistors 53, 57 and 58. The operational amplifier 51 operates as a voltage follower having a slow rise time characteristic being determined by a long RC time constant of the resistor 53 and the capacitor 54 being about 10 seconds, and a much faster release or fall time characteristic being determined by the time constant of the word detector 35 to provide a noise envelope signal which excludes the syllabic envelope fluctuations. The operational amplifier 56 also operates as a voltage follower to apply the noise envelope signal to a resistor 63.

Output signals from the two branches are summed in a summing circuit 60, which includes the previously mentioned resistors 62 and 63 and also includes an operational amplifier 61 and resistors 64–66. As the signals from the syllable detector are an inversion of the microphone signal envelope, and as the signal from the noise detector is the microphone signal envelope being limited to fluctuations corresponding to a word rate, the resultant output at the summing circuit 60 is a raw intelligence signal wherein the noise envelope is partially cancelled and syllabic portions of the microphone signal envelope, if present, predominate. The raw intelligence signal is further processed by an intelligence signal attenuator 90 to provide an intelligence signal for use by the comparator 26 or 26a as the case may be. The summed signal is also amplified by a DC amplifier 70 which includes operational amplifiers 71 and 75 and resistors 72–74, 76–78, as shown. At the output of the operational amplifier 75 the summed signal has been amplified between 1 and 2 db and level shifted slightly from the bias voltage B by an amount of a reference voltage VR. This signal is applied to a threshold signal attenuator 80 to provide a threshold signal for use by the comparator 26 or 26a as the case may be.

The threshold signal attenuator includes resistors 81 and 84, a switch 82, a diode 83 and a capacitor 85 as shown. When the switch 82 is controlled to go OFF the capacitor 85 discharges toward the reference voltage VR via the resistor 84 and when the switch 82 is controlled to be on, the capacitor 85 charges with a time constant determined by the values of the capacitor 85 and the resistor 81 in response to positive going summed signals. Generally it follows that during the presence of an intelligence signal in the opposite signal processor, the threshold signal attenuator switch in the transmit signal processing circuit is controlled to be OFF, and the threshold signal attenuator switch in the opposite signal attenuator is ON, and vice versa. However, occasionally depending upon circumstance in a handsfree telephone conversation, both the switches will be in the same state either ON or OFF simultaneously.

The intelligence signal attenuator 90 includes resistors 91, 95 and 97, capacitors 92 and 94, and switches 93 and 96, as shown. The summed signal is low pass-filtered by the resistor 91 and the capacitor 92 to provide the intelligence signals while the switch 93 is OFF. While the switch 93 is ON the intelligence signal is yet lower pass-filtered as a consequence of the capacitor 94 and attenuated by the resistor 95. When the switch 96 is also on the intelligence signal is yet further attenuated by the resistor 97. Generally, when the mode of operation is such that the channel feeding the signal processor circuit is also switched ON, the switches 93 and 96 are OFF and vice versa. However on occasion, depending upon the circumstances of a conversation, the switch 93 will be ON while the switch 96 is OFF. Thus the intelligence signal attenuator provides the intelligence signal as a result of switched selection of three distinct filter attenuator functional combinations.

In this example, the attenuators 80 and 90 are constructed with components and having values as listed in the following table:

| | |
|---|---|
| Switches 82, 93, 96 | MC14066B Analog Switch |
| Resistor 81 | 5.1 Kilohms |
| Resistor 84 | 100 Kilohms |
| Resistor 91 | 100 Kilohms |
| Resistor 95 | 220 Kilohms |
| Resistor 97 | 220 Kilohms |
| Capacitor 85 | 1 Microfarad |
| Capacitor 92 | 0.022 Microfarads |
| Capacitor 94 | 0.1 Microfarads |

Figure 3:
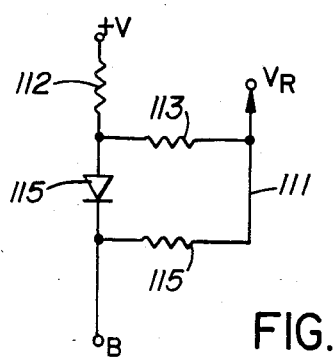
FIG. 3 is a schematic diagram of a controller used in the apparatus illustrated in FIG. 1.

Referring to FIG. 3, the reference voltage circuit includes a resistor 112 and a diode 115 connected in series forward aiding relationship between a +V terminal and the bias voltage terminal B. Resistors 113 and 114 are connected in series parallel with the diode 115. The resistor values are chosen to provide the voltage reference at a junction 111 of the resistors 113 and 114. The potential of the voltage reference is offset by about 30 millivolts more positive than the 2.25 volts DC at the bias terminal B.

Figure 4:
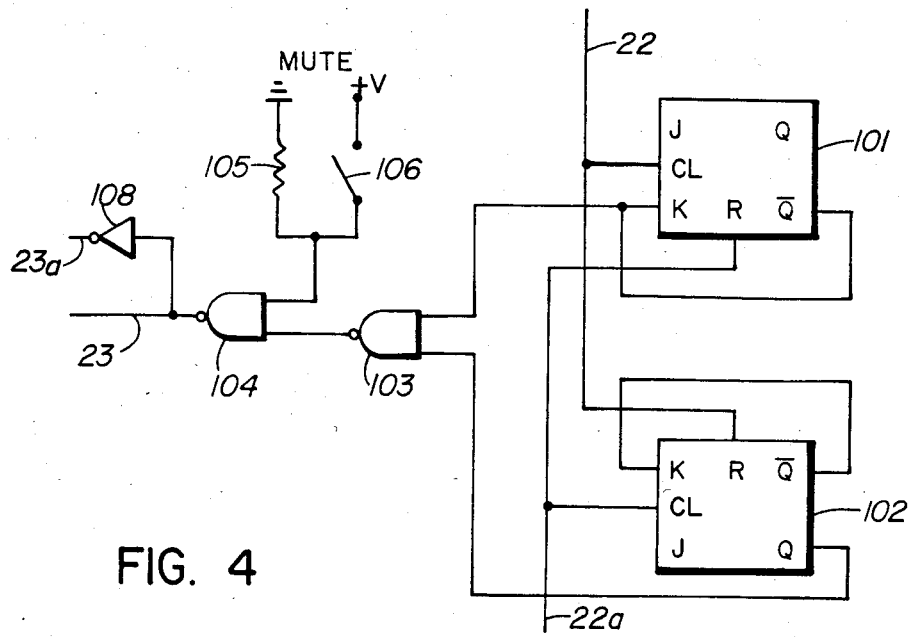
FIG. 4 is a schematic diagram of a voltage reference circuit for providing reference voltage to the signal processing circuit illustrated in FIG. 2.
Figure 5:
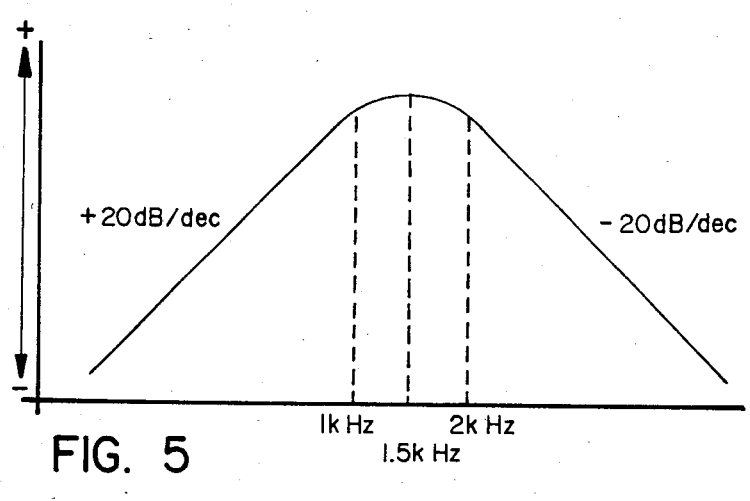
FIG. 5 is a graphical representation of a passband characteristic of a weighting network in FIG. 2.

Referring to FIG. 4, the sequential controller includes JK-type flip-flops 101 and 102, NAND gates 103 and 104, a resistor 105, a mute switch 106 and an inverter 108 as shown. The controller transforms successive high and low binary signal states from the transmit and receive comparators 26 and 26a, into the appropriate control signal assertions on the leads 23 and 23a for operating the apparatus in the transmit and receive modes.

Supposing that the apparatus is operating in the transmit mode, the transmit comparator 26 generates a stream of binary signal states, high and low, depending on the syllable structure of the signal from the microphone 11. The JK flip-flops 101 and 102 operate as first pulse detectors. The first signal state going high at the output of the transmit comparator 26 and applied at a clock input CL of the JK flip-flop 101 causes the JK flip-flop 101 to assume a logic state ONE. This flip-flop idles in the ONE state for the subsequent going high binary states because of the connection between its inverted Q output and its K input. The same first signal state going high from the output of the transmit comparator 26 is also applied at the reset input R of the JK flip-flop 102 and causes JK flip-flop to be jam reset to a logic ZERO state because of the higher priority of the reset input R as against the loop between the input K and the inverted Q output. In similar manner the first going high signal state from the output of the receive comparator 26a sets the JK flip-flop 102 to the logic ONE state and jam resets the JK flip-flop 101 to the logic ZERO state. The inverted Q output of the JK flip-flop 101 and the Q output of the JK flip-flop 102 are connected to inputs of the NAND gate 103, the output of which is inverted to provide the control signal on the lead 23 by the NAND gate 104 with the compliment of this signal being provided on the lead 23a by the inverter 108.

The resistor 105 and the switch 106 provide for a mute feature whereby the user of the apparatus may as desired operate the switch to hold the apparatus in the receive mode of operation to exclude the remote party from hearing utterances from the user or nearby persons.

By the circuit arrangement as previously described, the handsfree telephone communication apparatus has a tendency to operate in the transmit mode more than in the receive mode as is illustrated in the following table:

| JK FF 101 | JK FF 102 | Tx Mode (23) | Rx mode (23a) |
| --- | --- | --- | --- |
| 0 | 0 | 1 | 0 |
| 1 | 0 | 1 | 0 |
| 0 | 1 | 0 | 1 |
| 1 | 1 | 1 | 0 |

However during any break in a high signal state from the transmit comparator 26, a momentary high state from receive comparator 26a causes an instant transition to the receive mode, for example during one of the natural albeit short normally occurring pauses between some word syllables picked up by the microphone. This transition is fleeting as the microphone signal syllabic information easily again prevails having regard to the overall effects of the transmit and receive signal processing circuits. However, it has been found that the fleeting moment in the opposite mode of operation sufficiently prompts the talker to listen as a result of the perceived interruption, much as happens in a normal face-to-face conversation.

It is envisaged that in a more elaborate sequential controller the NAND gate logic elements will be replaced by clocked logic elements. Such a change will permit a circuit configuration providing a minor improvement. This improvement will eliminate the bias toward the transmit mode of operation which is exhibited by the example embodiment as illustrated in the immediately preceding table.

What is claimed is:

1. A handsfree communication terminal apparatus comprising:
    a transmit channel being operable in a transmit mode to transmit electrical signal representations of acoustical signals to a transmission facility;
    a receive channel being operable in a receive mode to reproduce acoustical signals in accordance with electrical signals received from the transmission facility;
    a sequential controller for generating binary transmit and receive mode signals in a mutually exclusive manner for operation of the transmit and receive channels respectively, in response to binary transmit and receive signals;
    a transmit signal converter being responsive to transmit intelligence and threshold signals for asserting the binary transmit signal while the former exceeds the latter;
    a receive signal converter being responsive to receive intelligence and threshold signals for asserting the binary receive signal while the former exceeds the latter;
    a transmit signal processing circuit for processing electrical voice band signals from the transmit channel to generate the transmit intelligence signal by one of at least two alternately selectable filter functions corresponding to the transmit mode signal being asserted or the receive mode signal being asserted, and for processing the electrical voice band signals from the transmit channel to generate the transmit threshold signal by a selectable filter function in accordance with the respective signal states of the binary receive signal;
    a receive signal processing circuit for processing electrical voice band signals from the receive path to generate the receive intelligence signal by one of at least two alternately selectable filter functions corresponding to the receive mode signal being asserted or the transmit mode signal being asserted, and for processing the electrical voice band signals from the receive channel to generate the receive threshold signal by a selectable filter function in accordance with the signal states of the binary transmit signal.

2. A handsfree communication terminal apparatus as defined in claim 1 wherein each of the transmit and receive signal processing circuits comprises:
    a noise detector being responsive to signals having an envelope characteristic corresponding to a rate of fluctuation of up to and including that typical of spoken words, for generating a noise envelope signal;
    a syllable detector being responsive to signals having an envelope characteristic corresponding to a rate of fluctuation of up to and including that typical of spoken syllables for generating a syllable envelope signal;
    first means, being responsive to the noise envelope signal and the syllable envelope signal, for generating a raw intelligence signal for filtering prior to use by the corresponding converter circuit, the raw intelligence signal being representative of the difference between the noise and syllable envelope signals; and
    second means being responsive to the binary signal being asserted by the opposite converter circuit, for generating the threshold signal with a potential resulting from a unidirectional low pass filtering of the raw intelligence signal and otherwise providing the threshold signal with a potential resulting from a low pass filtering of a predetermined DC reference voltage.

3. A handsfree communication terminal apparatus as defined in claim 1 wherein the sequential controller comprises:
    a first bistable circuit being connected to be jam reset by the binary receive signal and clock set by the binary transmit signal;

a second bistable circuit being connected to be jam reset by the binary transmit signal and clock set by the receive signal, and logic gating means being responsive to the instant set and reset states of first and second bistable circuits for generating the binary transmit and receive mode signals.

4. A handsfree communication terminal apparatus as defined in claim 2 wherein said at least two filter functions are provided in each of the transmit and receive signal processing circuits by a switchable filter comprising:

a first stage being a low pass filter network for low pass filtering the raw intelligence signal to provide the intelligence signal;

a second stage being a low pass filter network, which when connected in combination with the first stage low pass filter, for further low pass filtering and attenuating intelligence signal;

a third stage being an attenuator, which when connected in combination with the second and first stages, for further attenuating the intelligence signal;

a first switch for connecting the second stage low pass filter network in combination with the first stage low pass filter in response to the binary mode signal of the opposite channel being asserted; and a second switch for connecting the third stage attenuator in combination with the second stage in response to the binary signal being asserted by the opposite converter circuit.

5. A handsfree commuciation terminal apparatus including a transmit switch being controllable for passing signals from a microphone to a transmission interface, a receive switch being controllable for passing signals from the transmission interface to a loudspeaker, being characterized by:

a transmit signal processing means and a converter circuit for generating transmit binary signal assertions in response to syllable-like characteristics in the signals from the microphone;

a receive signal processing means and a converter circuit for generating receive binary signal assertions in response to syllable-like characteristics in the signals from the transmission interface; and a logic means including transmit and receive bistable circuits, each being clock setable by the respective binary signal assertions and each being jam reset in response to the opposite binary signal assertion, and logic gates responsive to the set and reset states of the bistable circuits for generating transmit mode and receive mode signals for controlling the respective switches.

6. A method for operating transmit and receive switches in transmit and receive channels being coupled to a transmission medium interface circuit and having a microphone and a loudspeaker respectively, to provide handsfree voice switched transmit and receive modes of operation in a communication terminal apparatus, the method being characterized by the steps of:

(a) generating transmit binary signal assertions in response to syllable-like fluctuations as distinct from monotonous level and word-like fluctuations in signals picked up by the microphone;

(b) generating receive binary signal assertions in response to syllable-like fluctuations as distinct from monotonous level and word-like fluctuations in signals received from the interface circuit;

(c) clock setting a transmit bistable circuit and jam resetting a receive bistable circuit in response to each occurrence of the transmit binary signal assertion;

(d) clock setting the receive bistable circuit and jam resetting the transmit bistable circuit in response to each occurrence of the receive binary signal assertion;

(e) decoding the instant signal states of the bistable circuits to generate transmit mode and receive mode control signals for operating the switches.

* * * * *